United States Patent
Sharpe et al.

(10) Patent No.: US 11,353,128 B2
(45) Date of Patent: Jun. 7, 2022

(54) VALVE BODY APPARATUS FOR USE WITH FLUID VALVES

(71) Applicant: Emerson Vulcan Holding LLC, St. Louis, MO (US)

(72) Inventors: Curtis Lamar Sharpe, Marshall, NC (US); John Scott Hutchinson, Brevard, NC (US); Matthew Douglas Forbes, Candler, NC (US); Aneesh Chandran, Bangalore (IN)

(73) Assignee: Emerson Vulcan Holding LLC, St. Louis, MO (US)

( * ) Notice: Subject to any disclaimer, the term of this patent is extended or adjusted under 35 U.S.C. 154(b) by 267 days.

(21) Appl. No.: 16/513,476

(22) Filed: Jul. 16, 2019

(65) Prior Publication Data

US 2020/0132205 A1 Apr. 30, 2020

(30) Foreign Application Priority Data

Oct. 31, 2018 (IN) .............................. 201811041090

(51) Int. Cl.
*F16K 17/06* (2006.01)
*F16K 27/02* (2006.01)
*F16K 15/02* (2006.01)

(52) U.S. Cl.
CPC ............ *F16K 17/06* (2013.01); *F16K 15/025* (2013.01); *F16K 27/0209* (2013.01)

(58) Field of Classification Search
CPC .... F16K 17/06; F16K 15/025; F16K 27/0209; F16K 27/12
See application file for complete search history.

(56) References Cited

U.S. PATENT DOCUMENTS

| | | | | |
|---|---|---|---|---|
| 3,411,530 A | * | 11/1968 | Powell | F16K 17/0433 137/475 |
| 3,993,095 A | * | 11/1976 | Flynn | A61M 16/20 137/596.1 |
| 4,679,767 A | * | 7/1987 | Vollmer | H01F 7/1607 251/129.15 |
| 5,341,838 A | * | 8/1994 | Powell | F16K 17/0433 137/478 |
| 2008/0022983 A1 | * | 1/2008 | Martindale | F02D 19/023 123/575 |
| 2017/0307094 A1 | * | 10/2017 | Choate | F16K 1/34 |

OTHER PUBLICATIONS

Emerson, "Kunkle Series 6000 Safety Valves," Safety and Relief Products, VCTDS-00394-EN,2017, 2 pages.

* cited by examiner

*Primary Examiner* — P. Macade Nichols
(74) *Attorney, Agent, or Firm* — Hanley, Flight & Zimmerman, LLC

(57) ABSTRACT

Methods, apparatus, systems and articles of manufacture are disclosed for valve body apparatus for use with fluid valves. An example fluid valve apparatus includes a valve body including a housing positioned on an exterior surface of the valve body, a calibration set screw disposed in the housing via a recessed aperture, and a cover coupled to the housing to seal the calibration set screw from external access.

20 Claims, 4 Drawing Sheets

VALVE BODY APPARATUS FOR USE WITH FLUID VALVES

This patent claims priority to, and benefit of, Indian Patent Application Serial No. 201811041090, which was filed on Oct. 31, 2018. Indian Patent Application Serial No. 201811041090 is hereby incorporated by reference in its entirety.

FIELD OF THE DISCLOSURE

This disclosure relates generally to fluid valves and, more particularly, to valve body apparatus for use with fluid valves.

BACKGROUND

Pressure relief valves are used in a variety of commercial, industrial, and domestic applications to maintain a pressure within a system below a predetermined maximum pressure. Specifically, if the pressure within the system exceeds a predetermined maximum pressure, the pressure relief valve vents a fluid or vapor to the atmosphere and/or other outlet until the pressure within the system decreases below the predetermined maximum pressure.

SUMMARY

An example fluid valve apparatus includes a valve body including a housing positioned on an exterior surface of the valve body, a calibration set screw disposed in the housing via a recessed aperture, and a cover coupled to the housing to seal the calibration set screw from external access.

An example apparatus includes a fluid valve including a valve body, a portion of the valve body extending from an exterior surface of the valve body to form a casing, a calibration adjuster disposed in the casing, and a guard coupled to the portion of the valve body to enclose the calibration adjuster.

An example fluid valve apparatus includes a valve body including an outer shell sized to house one or more adjusters that are each configured to enable adjustment of an operational characteristic of the fluid valve, and a cover plate positioned on the outer shell to restrict the one or more adjusters from external access.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

A valve body is the outer casing (e.g., shell) that contains the internal components of a fluid valve. Valve bodies are manufactured to withstand high pressures associated with various applications. Some known fluid valves include one or more adjustment screws to change opening and/or closing characteristics (e.g., operational characteristics) of the fluid valve (e.g., a reseat pressure, a set pressure, an overpressure value, etc.). Known adjustment screws are exposed to external access (e.g., exposed to a surrounding environment) and include a lead wire seal that is fed through the adjustment screws and crimped to provide an anti-tamper seal. Such lead wire seals are expensive and difficult to install, resulting in high material and production costs of the fluid valve.

Example valve bodies disclosed herein include an anti-tamper housing to enclose adjustment set screws. Example anti-tamper housings disclosed herein include a cover plate that is permanently fastened (e.g., coupled via permanent fasteners) to provide anti-tamper properties. As used herein, the term "permanently fastened" is expressly defined as two components coupled via a permanent fasten (e.g., a rivet), whereby the two components cannot be uncoupled without deforming at least one of the two components. Further, example valve bodies disclosed herein eliminate expensive lead wire seals, resulting in lower production costs and easier installation.

Figure 1:
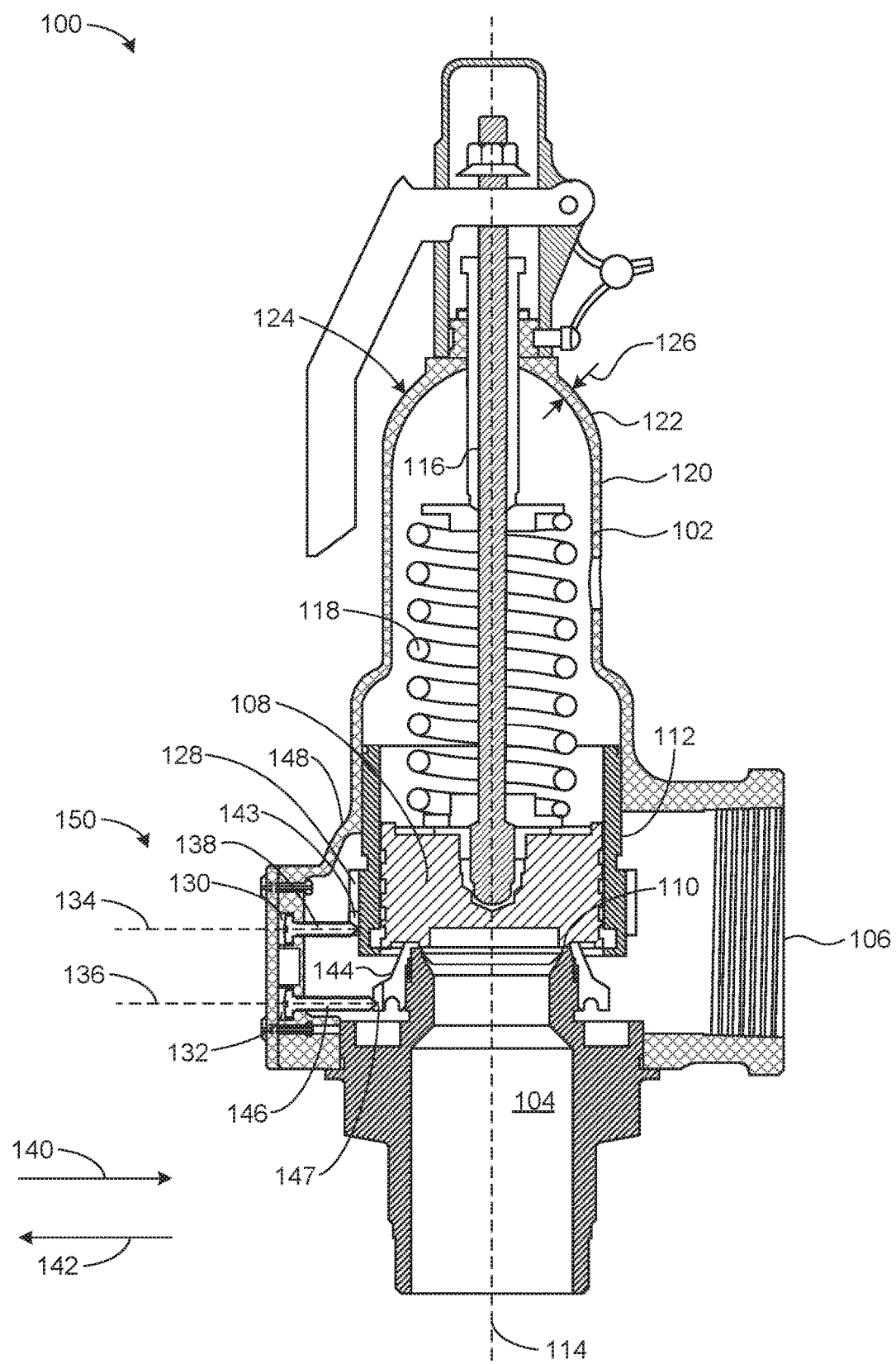
FIG. 1 is a cross-sectional view of an example fluid valve constructed in accordance with teachings of this disclosure.

FIG. 1 is a cross-sectional view of an example fluid valve 100 constructed in accordance with teachings of this disclosure. In the illustrated example, the fluid valve 100 is a pressure relief valve. The fluid valve 100 includes an example valve body 102 defining an example inlet 104 and an example outlet 106 through which fluid respectively enters and exits the fluid valve 100. In some examples, the inlet 104 and the outlet 106 are threadably coupled to other devices within a system (e.g., a pressure vessel, a tank, a pipe, etc.). In other examples, the outlet 106 is open relative to a surrounding environment (e.g., not fluidly coupled to a device) to vent fluid into the environment. In the illustrated example, an example valve disc 108 releasable engages an example seating surface 110 to permit or prevent fluid flow through the fluid valve 100. For example, when the valve disc 108 is in contact with (e.g., engaged with) the seating surface 110, the valve disc 108 prevents fluid from flowing from the inlet 104 to the outlet 106. When the valve disc 108 disengages from the seating surface 110 (e.g., is no longer in contact with the seating surface 110), fluid flows through the fluid valve 100 from the inlet 104 to the outlet 106.

In the illustrated example, the valve disc 108 is in contact with an example guide 112. The guide 112 is sized to guide the valve disc 108 as the valve disc 108 moves along a first longitudinal axis 114 of the fluid valve 100 between a closed position in which the valve disc 108 sealingly engages the seating surface 110 and an open position in which the valve disc 108 is separated from the seating surface 110. The guide 112 provides lateral stability and enables only vertical displacement as the valve disc 108 travels between the closed position and the open position, thereby reducing mechanical stress. In the illustrated example, the valve disc 108 is coupled to an example valve stem 116. In the illustrated example, a spring 118, which is positioned around the valve stem 116, urges the valve disc 108 and the valve stem 116 coupled thereto, toward the seating surface 110. The spring 118 exerts a predetermined force on the valve disc 108 that urges the valve disc 108 toward the seating surface 110 (i.e., downward in the orientation shown in FIG. 1) against fluid pressure at the inlet 104 of the fluid valve 100 that exerts a force (e.g., a force generated by the pressure multiplied by an area of the valve disc 108) on the valve disc 108 in the opposite direction (i.e., upward in the orientation in FIG. 1). As pressure at the inlet 104 increases, the force exerted on the valve disc 108 increases proportionally until it overcomes the predetermined force exerted by the spring 118, which causes the valve disc 108 to separate from the seating surface 110.

In some examples, the fluid valve 100 has a predetermined set pressure (e.g., a pressure at which the fluid valve 100 opens). When the force exerted on the valve disc 108 exceeds the predetermined force provided by the spring 118 (e.g., the pressure at the inlet 104 exceeds the set pressure of the fluid valve 100), the valve disc 108 is urged away from the seating surface 110. In some examples, as pressure in the fluid valve 100 increases, the valve disc 108 moves further from the seating surface 110, allowing more fluid to flow through the fluid valve 100. In some examples, the fluid valve 100 has an overpressure value (e.g., a pressure value at which the fluid valve is at maximum lift). In some examples, the fluid valve 100 has a predetermined reseal pressure (e.g., a pressure at which the fluid valve 100 closes). In some examples, pressure decreases in the fluid valve 100 when the fluid is allowed to flow through the outlet 106, and the valve disc 108 moves toward the seating surface 110 until the valve disc 108 contacts the seating surface 110. In some examples, the fluid valve 100 has a blowdown (e.g., a blowdown pressure) defined by a relationship between the set pressure and the resew pressure (e.g., a difference between the set pressure and the reseat pressure).

In the illustrated example, the valve body 102 includes an example side wall 120. The side wall 120 transitions into an example curved surface 122. A combination of the side wall 120 and the curved surface 122 forms an example dome-shaped top surface 124 of the valve body 102. In some examples, the dome shape of the top surface 124 enables the valve body 102 to withstand higher pressures due to the manner in which the dome-shaped geometry distributes forces or stresses. As a result, an example thickness 126 of the top surface 124 of the valve body 102 can be decreased, thereby reducing material and production costs and overall weight of the fluid valve 100.

In the illustrated example, an example guide ring 128 is operatively disposed on the guide 112 to modulate opening characteristics of the fluid valve 100 (e.g., a reseat pressure, a set pressure, an overpressure value, etc.). In some examples, the guide 112 may control the opening, performance (e.g., lift), and/or closing of the fluid valve 100. In the illustrated example, the valve body 102 includes an example first aperture 130 and an example second aperture 132. The first aperture 130 extends into the valve body 102 along an example second axis 134. The second aperture 132 extends into the valve body 102 along an example third axis 136. In the illustrated example, the second and the third longitudinal axes 134, 136 are substantially parallel. In some examples, the second and the third axes 134, 136 are non-parallel.

In the illustrated example of FIG. 1, an example first adjustment set screw 138 (e.g., an adjuster, a calibration adjuster, a calibration set screw, etc.) is disposed in the first aperture 130 of the valve body 102 along the second axis 134. In some examples, the first adjustment set screw 138 can move in an example first direction 140 and an example second direction 142 opposite the first direction 140 to engage/disengage an example first slot 143 of the guide ring 128. For example, movement of the first adjustment set screw 138 in the first direction 140 causes the first adjustment set screw 138 to engage the first slot 143 of the guide ring 128 and, thus, maintains a position of the guide ring 128. Movement of the first adjustment set screw 138 in the second direction 142 causes the first adjustment set screw 138 to disengage the first slot 143 of the guide ring 128 and, thus, enables the guide ring 128 to translate vertically along the first longitudinal axis 114. In some examples, movement of the guide ring 128 in an upward direction decreases the blowdown of the fluid valve 100. In some examples, movement of the guide ring 128 in a downward direction increases the blowdown of the fluid valve 100.

In the illustrated example of FIG. 1, an example regulator ring 144 is operatively coupled to the inlet 104 of the fluid valve 100 to enable further adjustment of the operating characteristics of the fluid valve 100 (e.g., a reseat pressure, a set pressure, an overpressure value, etc.). An example second adjustment set screw 146 (e.g., an adjuster, a calibration adjuster, a calibration set screw, etc.) is disposed in the second aperture 132 of the valve body 102 along the third axis 136. In some examples, the second adjustment set screw 146 can move in the first and the second directions 140, 142 to engage/disengage an example second slot 147 of the regulator ring 144. For example, movement of the second adjustment set screw 146 in the first direction 140 causes the second adjustment set screw 146 to engage the second slot 147 of the regulator ring 144 and, thus, maintains a position of the regulator ring 144. Movement of the second adjustment set screw 146 in the second direction 142 causes the second adjustment set screw 146 to disengage the second slot 147 of the regulator ring 144 and, thus, enables the regulator ring 144 to translate vertically along the first longitudinal axis 114. In some examples, movement of the regulator ring 144 in an upward direction increases the blowdown of the fluid valve 100. In some examples, movement of the regulator ring 144 in a downward direction decreases the blowdown of the fluid valve 100.

In the illustrated example of FIG. 1, an example exterior surface 148 of the valve body 102 includes an example housing 150 (e.g., an anti-tamper housing, a blister, a casing, an outer shell, etc.). In the illustrated example, the housing 150 and the valve body 102 are unitary. In other examples, the housing 150 is separate from the valve body 102 and attached to the valve body 102 via one or more permanent fastener; (e.g., rivets). The housing 150 is sized to enclose the first and second adjustment set screws 138, 146. The housing 150 will be described in more detail in connection with FIG. 2.

Figure 2:
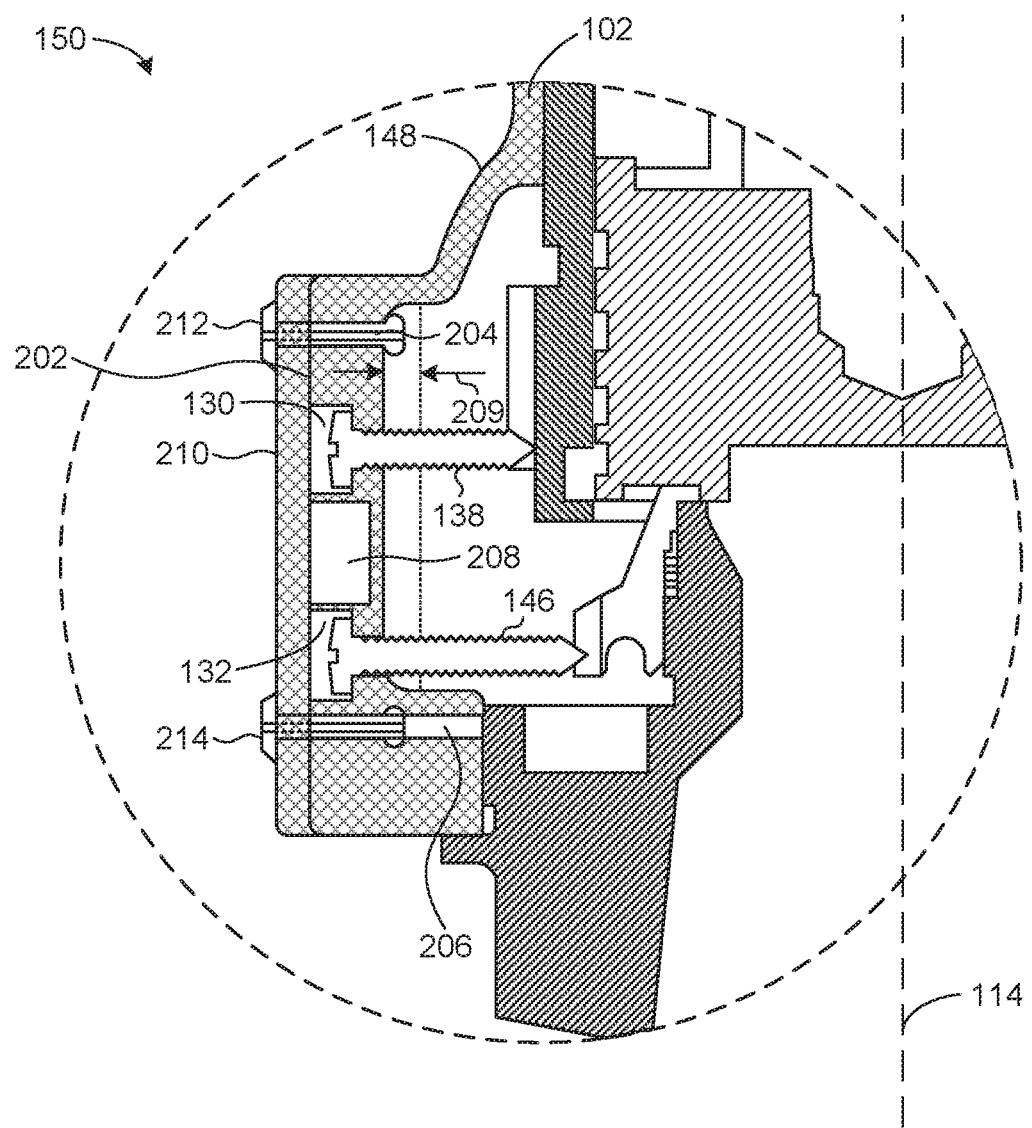
FIG. 2 is a cross-sectional view of an example housing of the fluid valve of FIG. 1.
Figure 3:
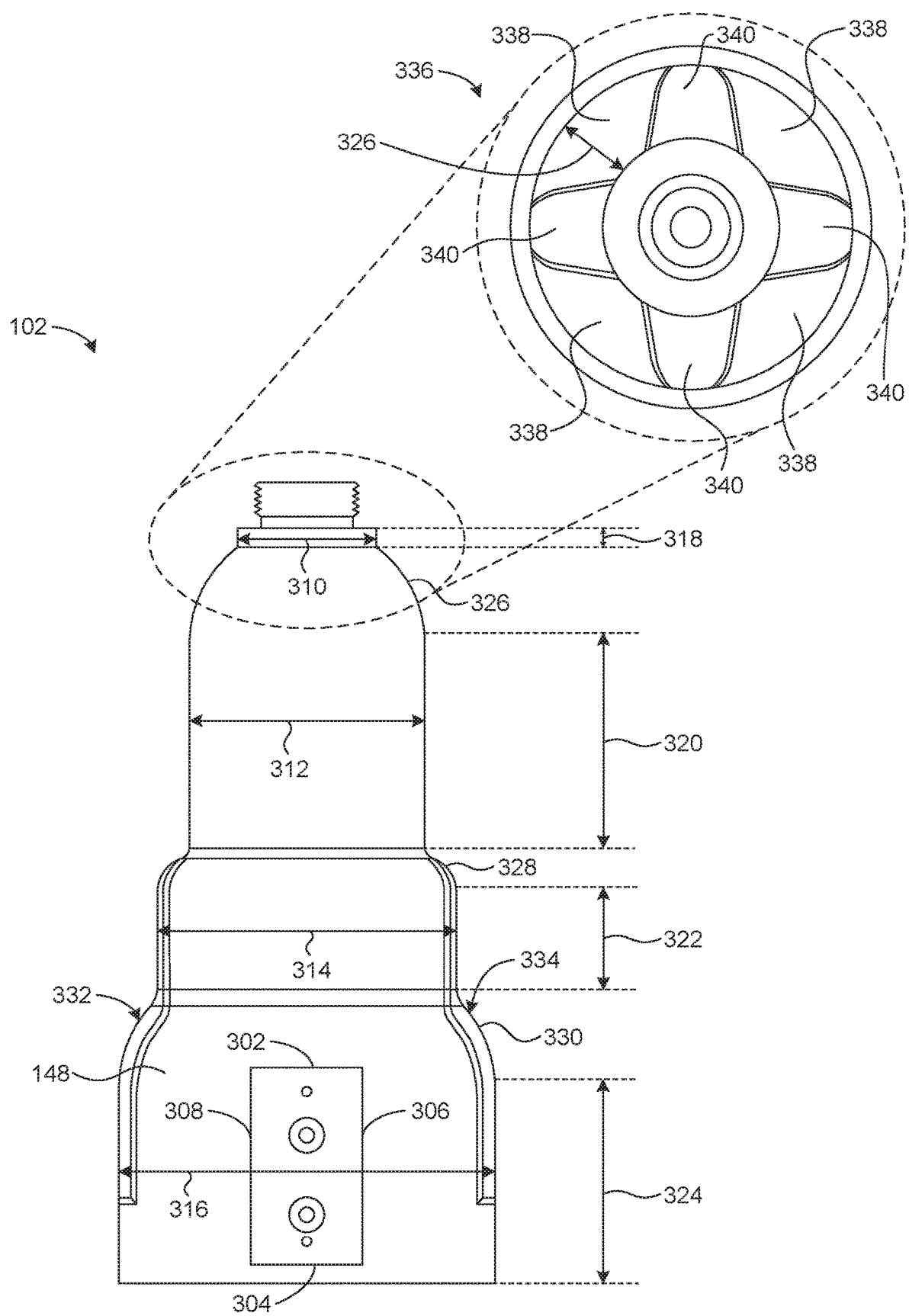
FIG. 3 is a side view of an example valve body of the fluid valve of FIG. 1.

FIG. 2 is a cross-sectional view of the housing 150 of FIG. 1. FIG. 3 is a side view of the valve body 102 of FIG. 1. In the illustrated example of FIGS. 2 and 3, the housing 150 includes an example first wall 302 (FIG. 3), an example second wall 304, an example third wall 306, and an example fourth wall 308. In some examples, the first wall 302 is substantially parallel to the second wall 304, and the third wall 306 is substantially parallel to the fourth wall 308. In some examples, the first, second, third, and fourth walls 302, 304, 306, 308 extend from the exterior surface 148 of the valve body 102. In some examples, the first, second, third, and fourth walls 302, 304, 306, 308 extend perpendicularly from the valve body 102 with respect to the first longitudinal axis 114.

As shown in FIG. 2, the first and the second apertures 130, 132 extend into the housing 150. In some examples, the first and second apertures 130, 132 do not extend through the housing 150. In the illustrated example of FIG. 2, the first and the second apertures 130, 132 are recessed apertures (e.g., counter-bored holes) formed in an example outer surface 202 of the housing 150. In some examples, the outer surface 202 is defined by the first, second, third, and fourth walls 302, 304, 306, 308 (FIG. 3).

In the illustrated example of FIG. 2, the outer surface 202 of the housing 150 includes an example first passage 204 and an example second passage 206. The first and second passages 204, 206 extend through the housing 150. In some examples, the first and second passages 204, 206 are sized to receive a fastening means a permanent fastener, a rivet, etc.). The housing 150 further includes an example cavity 208 (i.e., an internal cavity) in some examples, the cavity 208 is positioned between the first and second apertures 130, 132. In other examples, the cavity 208 is positioned anywhere within the housing 150. The cavity 208 decreases material of the housing 150 and, thus, reduces material and production costs of the fluid valve 100. In some examples, the cavity 208 defines a connecting slot between the first and second apertures 130, 132. Although only one cavity 208 is shown in the illustrated example, any number of cavities may be used to further reduce material and/or weight of the fluid valve 100. In the illustrated example, an example thickness 209 is removed from the valve body 102 to further reduce material and production costs of the fluid valve 100.

To ensure that the first and second adjustment set screws 138, 146 are not exposed to external access (e.g., exposed to the environment surrounding the fluid valve 100), an example cover 210 (e.g., a guard, a cover plate, etc.) is coupled to the outer surface 202 of the housing 150. In the illustrated example of FIG. 2, the cover 210 seals the first and second apertures 130, 132 from the surrounding environment of the fluid valve 100. In some examples, the cover 210 identifies a manufacturer of the fluid valve 100 by including a name of the manufacturer, a color indicative of the manufacturer, etc. In the illustrated example of FIG. 2, the cover 210 is permanently coupled to the housing 150 via an example first rivet 212 and an example second rivet 214. In some examples, the first and second rivets 212, 214 are permanently disposed in the first and second passages 204, 206, respectively. In some examples, the first and second rivets 212, 214 cannot be removed from the first and second passages 204, 206 without destroying the cover 210. As a result, the first and second rivets 212, 214 ensure that the housing 150 is anti-tamper and that the first and second adjustment set screws 138, 146 are inaccessible. In some examples, at least one of the first or second rivets 212, 214 is color coded to indicate the manufacturer of the fluid valve 100.

In the illustrated example of FIG. 3, the valve body 102 includes an example first dimensional characteristic 310, an example second dimensional characteristic 312, an example third dimensional characteristic 314, and an example fourth dimensional characteristic 316. The first dimensional characteristic 310 (e.g., diameter) defines an example first portion 318 of the valve body 102. The second dimensional characteristic 312 (e.g., diameter) defines an example second portion 320 of the valve body 102. The third dimensional characteristic 314 (e.g., diameter) defines an example third portion 322 of the valve body 102. The fourth dimensional characteristic 316 (e.g., diameter) defines an example fourth portion 324 of the valve body 102. In the illustrated example of FIG. 3, the first dimensional characteristic 310 is less than the second dimensional characteristic 312. In the illustrated example of FIG. 3, the first portion 318 transitions into the second portion 320 via an example first curved surface 326. In the illustrated example of FIG. 3, the second dimensional characteristic 312 is less than the third dimensional characteristic 314. The second portion 320 transitions into the third portion 322 via an example second curved surface 328. The third dimensional characteristic 314 is less than the fourth dimensional characteristic 316. In the illustrated example of FIG. 3, the third portion 3 transitions into the fourth portion 324 via an example third curved surface 330. In other examples, the valve body 102 may include any number of portions and/or dimensional characteristics.

In the illustrated example of FIG. 3, the valve body 102 includes an example first rib 332 and an example second rib 334. The first and second ribs 332, 334 protrude from the exterior surface 148 of the valve body 102. In the illustrated example, the first rib 332 is positioned opposite the second rib 334. In the illustrated example, the first and second ribs 332, 334 extend along the exterior surface 148 of the valve body 102 from the second curved surface 328 to the fourth portion 324. In other examples, the first and second ribs 332, 334 may have any orientation on the valve body 102. In some examples, the first and second ribs 332, 334 strengthen portions of the valve body 102 that experience high pressure and/or mechanical stress, thus enabling surrounding portions of the valve body 102 (e.g., the first portion 318, the first curved surface 326, and/or the second portion 320) to have reductions in material thickness. Reductions in material thickness result in reduced production costs and overall weight of the fluid valve 100. In other examples, the valve body 102 may include any number of ribs to achieve a desired material thickness of the valve body 102.

In the illustrated example of FIG. 3, a top view 336 of the valve body 102 is shown. In some examples, the first curved surface 326 includes a plurality of example depressions 338. In the illustrated example of FIG. 3, four depressions 338 are incorporated into the first curved surface 326. In other examples, any number of depressions 338 may be used to achieve a desired weight of the fluid valve 100. In some examples, the depressions 338 may be positioned on any portion of the valve body 102. In some examples, the depressions 338 are apertures extending into the first curved surface 326 to reduce material thickness of the first curved surface 326. The first curved surface 326 is able to withstand high pressures while reducing material thickness as a result of the curved geometry. Reducing the material thickness of the first curved surface 326 results in reduced production costs and overall weight of the fluid valve 100. In the illustrated example of FIG. 3, the depressions 338 are trapezoidal shaped and evenly distributed about a perimeter of the first curved surface 326. The depressions 338 are separated by a plurality of example ribs 340. In other examples, the depressions 338 may be any desirable shape to reduce a material thickness of the valve body 102. In other examples, any number of depressions 338 and ribs 340 may be applied to the first curved surface 326, the second curved surface 328, the third curved surface 330, or a combination thereof to achieve a desired material thickness of the valve body 102.

Figure 4:
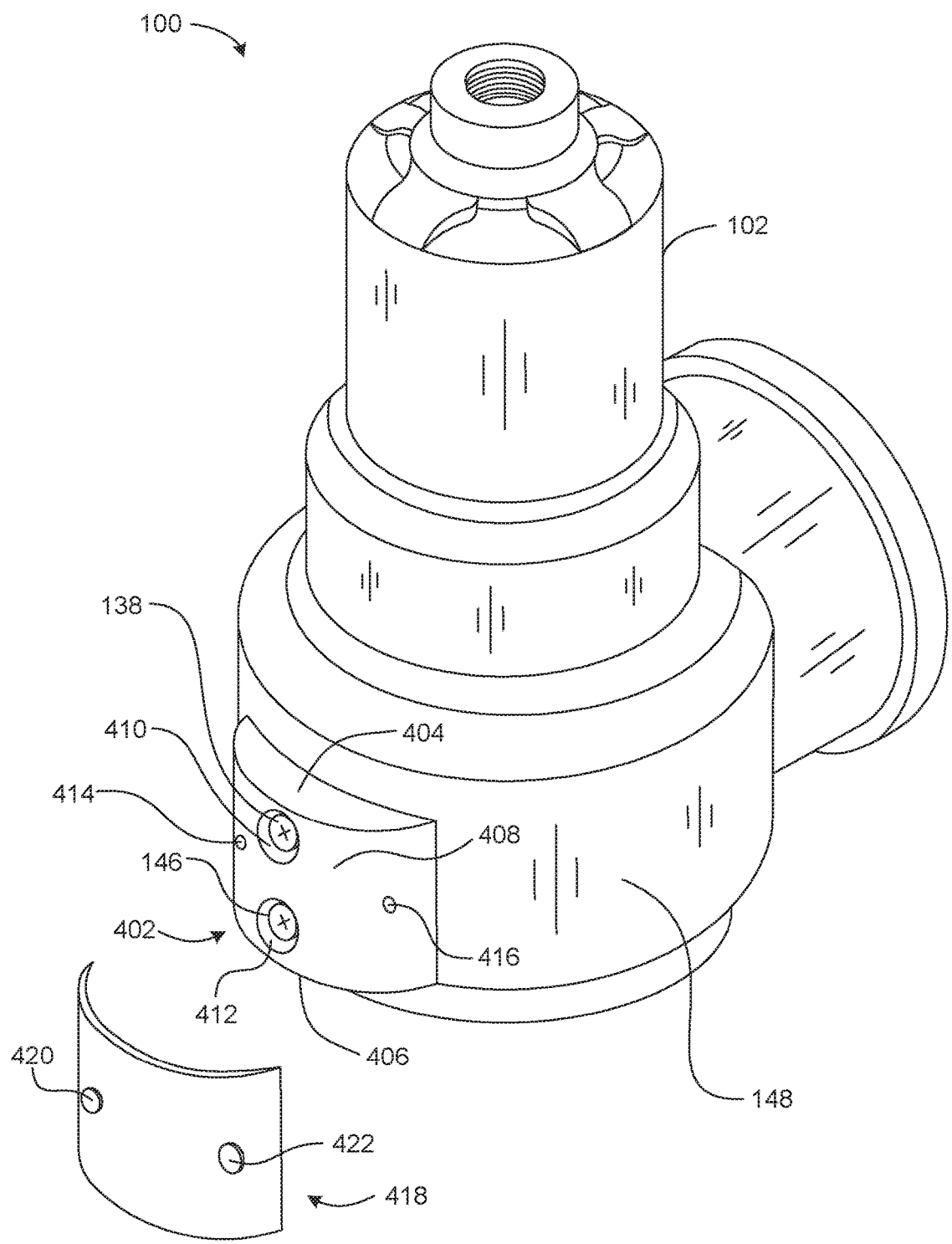
FIG. 4 is a perspective view of the fluid valve of FIG. 1 with a second example housing.

FIG. 4 is a perspective view of the fluid valve 100 of FIG. 1 with a second example housing 402. In the illustrated example, the exterior surface 148 of the valve body 102 includes the housing 402 (e.g., an anti-tamper housing, a blister, a casing, an outer shell, etc.). In the illustrated example, the housing 402 and the valve body 102 are unitary. In other examples, the housing 402 is separate from the valve body 102 and attached to the valve body 102 via one or more permanent fasteners (e.g., rivets). The housing 402 is sized to enclose the first and second set screws 138, 146 (FIGS. 1-2).

In the illustrated example of FIG. 4, the housing 402 includes an example first wall 404, an example second wall 406, and an example curved surface 408. The first wall 404 and the second wall 406 are crescent-shaped and extend from the exterior surface 148 of the valve body 102. In some examples, the first wall 404 and second wall 406 are parallel and include the same geometric shape. In some examples, the first and second walls 404, 406 are substantially perpendicular to the exterior surface 148 of the valve body 102. In the illustrated example, the first and second walls 404, 406 are connected via the curved surface 408. An example first aperture 410 and an example second aperture 412 extend into the housing 402. In some examples, the first and second apertures 410, 412 are recessed apertures (e.g., counter-bored holes) formed in the curved surface 408 of the housing 402. In some examples, the first and second apertures 410, 412 are sized to receive the first and second adjustment set screws 138, 146 (FIGS. 1-2). In the illustrated example, the curved surface 408 includes an example first passage 414 and an example second passage 416. The first and second passages 414, 416 are sized to receive a fastening means (e.g., a permanent fastener, a rivet, etc.).

In the illustrated example of FIG. 4, an example curved cover 418 (e.g., a guard, a cover plate, etc.) is coupled to the curved surface 408 of the housing 402 to ensure that the first and second adjustment set screws 138, 146 are not exposed to external access (e.g., exposed to the environment surrounding the fluid valve 100). In some examples, the curved cover 418 has the same geometry as the curved cover 418 to seal the first and second apertures 410, 412 from the surrounding environment of the fluid valve 100. In some examples, the curved cover 418 identifies a manufacturer of the fluid valve 100 by including a name of the manufacturer, color indicative of the manufacturer, etc. In the illustrated example, the curved cover 418 is permanently coupled to the housing 402 via an example first rivet 420 and an example second rivet 422. In some examples, the first and second rivets 420, 422 are permanently disposed in the first and second passages 414, 416, respectively. In some examples, the first and second rivets 420, 422 cannot be removed from the first and second passages 414, 416 without destroying and/or deforming the curved cover 418. As a result, the first and second rivets 420, 422 ensure that the housing 402 is anti-tamper and that the first and second adjustment set screws 138, 146 are inaccessible. In some examples, at least one of the first or second rivets 420, 422 is color coded to indicate the manufacturer of the fluid valve 100.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

From the foregoing, it will be appreciated that example apparatus have been disclosed that enable an anti-tamper housing to prevent tampering with calibration adjustments of a fluid valve. Example fluid valve apparatus have been disclosed that prevent an operator from tampering with one or more adjustment screws without deforming or destroying the anti-tamper housing. Example fluid valve apparatus have been disclosed that eliminate wire seals associated with adjustment screws of known fluid valves. Known wire seals are expensive and difficult to install and, thus, eliminating wire seals decreases material and production costs of disclosed fluid valves. Furthermore, fluid valve apparatus have been disclosed that include a dome-shaped valve body with depressions. The dome-shaped valve body and depressions increases the strength of the fluid valve and, thus, allows material thickness of the valve body to be decreased. Reduction of material of the valve body results in lower material and production costs.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A fluid valve apparatus, comprising:
   a valve body including a housing positioned on an exterior surface of the valve body;
   a first adjustment set screw and a second adjustment set screw disposed in the housing, the first adjustment set screw disposed in a first aperture of the valve body to engage a first opening of a guide ring and the second adjustment set screw disposed in a second aperture of the valve body to engage a second opening of a regulator ring; and
   a cover coupled to the housing to seal the first adjustment set screw or the second adjustment set screw from external access.

2. The fluid valve apparatus of claim 1, wherein the cover is coupled to the housing via one or more permanent fasteners.

3. The fluid valve apparatus of claim 1, wherein the first aperture of the valve body or the second aperture of the valve body is at least one of a counter-bored hole or slot.

4. The fluid valve apparatus of claim 1, wherein the first adjustment set screw or the second adjustment set screw includes a calibration set screw to adjust at least one of an opening characteristic or closing characteristic of the fluid valve.

5. The fluid valve apparatus of claim 1, wherein the housing includes a cavity.

6. The fluid valve apparatus of claim 1, wherein the cover identifies a manufacturer of the fluid valve apparatus.

7. The fluid valve apparatus of claim 1, wherein the valve body and the housing are unitary.

8. An apparatus, comprising:
   a fluid valve including a valve body, a portion of the valve body extending from an exterior surface of the valve body to form a casing;
   a first calibration adjuster and a second calibration adjuster disposed in the casing, the first calibration adjuster disposed in a first aperture of the valve body to engage a first slot of a guide ring and the second calibration adjuster disposed in a second aperture of the valve body to engage a second slot of a regulator ring; and
   a guard coupled to the portion of the valve body to enclose the first calibration adjuster or the second calibration adjuster.

9. The apparatus of claim 8, wherein the guard is coupled to the portion of the valve body via one or more rivets.

10. The apparatus of claim 8, wherein the first calibration adjuster or the second calibration adjuster is disposed in the casing via a recessed aperture.

11. The apparatus of claim 8, wherein a position of the at least one of the guide ring or the regulator ring is configured to adjust an operational characteristic of the fluid valve.

12. The apparatus of claim 8, wherein the casing includes an internal cavity.

13. The apparatus of claim 8, wherein the casing is arc-shaped.

14. The apparatus of claim 8, wherein the valve body and the casing are unitary.

15. A fluid valve apparatus, comprising:
   a valve body including an outer shell sized to house a first adjuster and a second adjuster that are each configured to enable adjustment of an operational characteristic of the fluid valve, the first adjuster disposed in a first aperture of the valve body to engage a guide ring and the second adjuster disposed in a second aperture of the valve body to engage a regulator ring; and
   a cover plate positioned on the outer shell to restrict the one or more adjusters from external access.

16. The fluid valve apparatus of claim 15, wherein the cover plate is coupled to the outer shell via one or more permanent fasteners to form an anti-tamper housing.

17. The fluid valve apparatus of claim 15, wherein the first adjuster or the second adjuster is housed within the outer shell via one or more respective recessed apertures.

18. The fluid valve apparatus of claim 15, wherein the outer shell includes walls substantially perpendicular to an exterior surface of the valve body.

19. The fluid valve apparatus of claim 18, wherein the walls of the outer shell define an internal cavity.

20. The fluid valve of claim 15, wherein the operational characteristic is one of an overpressure value and a blowdown value.

\* \* \* \* \*